Jan. 2, 1945. P. W. SOUDER 2,366,366
METHOD OF MAKING FORMED DOUGH PRODUCTS
Filed July 10, 1941
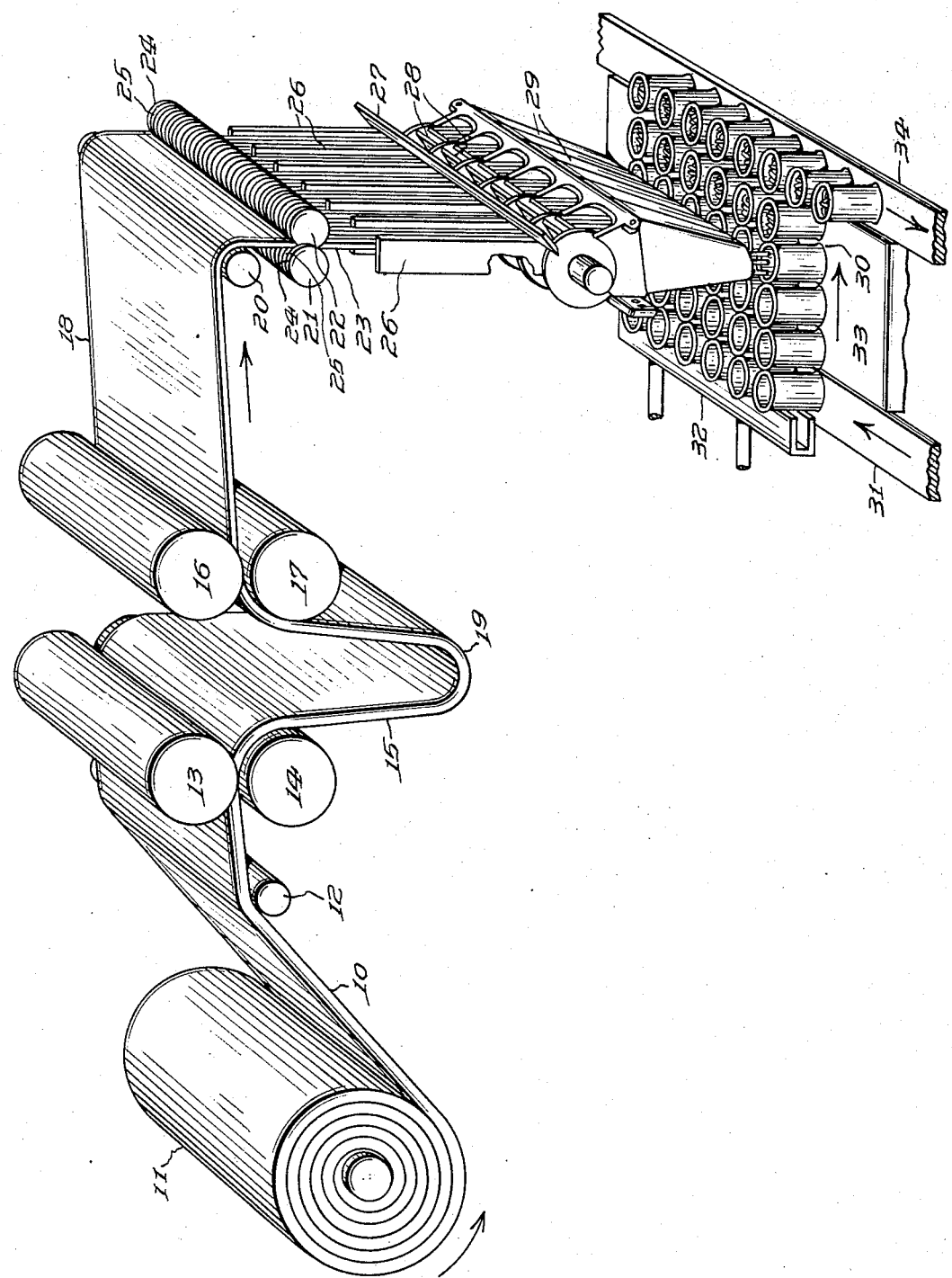
INVENTOR
Philip Walburn Souder
WITNESS
F. J. Hartman.
BY John D. Myers
ATTORNEY Patented Jan. 2, 1945

2,366,366

UNITED STATES PATENT OFFICE 2,366,366

METHOD OF MAKING FORMED DOUGH PRODUCTS

Philip Walburn Souder, Moorestown, N. J., assignor to Campbell Soup Company, a corporation of New Jersey Application July 10, 1941, Serial No. 401,861

3 Claims. (Cl. 99—182)

The invention relates to a method of making formed dough products, and is disclosed herein in connection with a continuous procedure for preparing noodles and placing them in permanent containers which are sealed and sterilized after the other ingredients of the desired product, such as chicken noodle soup, are placed therein. It will be understood, however, that the method is applicable to the preparation and treatment of other alimentary paste products, such as spaghetti and macaroni.

In accordance with the usual practice of making a formed dough product of the noodle type, the required dough ingredients, such as flour, eggs, water and salt, are mixed in such quantities as to produce a dough of the characteristics desired, and the mixture is kneaded for such a time as may be necessary to develop the glutinous properties of the flour. The dough is then passed repeatedly through a dough brake which it leaves in a sheet approximately three-sixteenths of an inch thick, and this sheet is thereupon wound into a roll. The roll of dough is transferred to a noodle cutting machine in which the relatively thick sheet is passed between compressing rollers for reducing the thickness of the sheet to the thickness desired in the noodles. From these compressing rollers the thin sheet is delivered to a cutting mechanism which divides the sheet into strips of the desired width. These strips are then severed by suitable cutting mechanism into noodle lengths, and the cut noodles are collected in trays and subjected to a drying operation. The drying operation may be carried out in special drying rooms in which the temperature, humidity and circulation of air are controlled, or it may be carried out in a continuous dryer. With the latter, three to four hours are required for drying the noodles, while fifteen to twenty hours are required if the drying operation is carried out in an ordinary drying room. By either method of drying, careful control is required in order that a satisfactory and undamaged product may be obtained.

In using noodles as an ingredient of a canned food product, such as chicken noodle soup, the common practice heretofore has been to place a definite quantity of the dried noodles, prepared in the manner heretofore described, in a measured amount of boiling water and continue the cooking operation for the necessary period of time. The noodles are thereupon cooled, and are weighed manually and transferred to cans in which the other soup ingredients are later placed. The cans are then sealed and heated in some suitable manner for the purpose of sterilizing the contents.

Inasmuch as the procedure which is commonly followed in the manufacture of chicken noodle soup and the like requires that the noodles be cured or dried during the noodle making process, and also requires that moisture be again added to the dried noodles in the process of making the noodles into soup, the customary process is extremely wasteful and expensive from the standpoint of time and labor as well as the floor space which is required for carrying out the various steps in making the noodles and in making the soup. Where drying rooms are employed for drying the noodles, an unusual amount of floor space is necessary for drying noodles in the quantity required in the manufacture of soup on a large scale. A continuous noodle drier also takes up a large amount of floor space and is comparatively expensive. Furthermore, with the customary procedure which is followed in the manufacture of noodles, the product is exposed to contamination by repeated handling in the operations of drying, packaging, cooking, cooling and weighing. A further objection to the conventional procedure is that, by reason of the personal factor involved in weighing the small amount of noodles required for each can, it has been difficult to obtain the desired uniformity in the quantity placed in the cans. It has also been difficult to obtain a noodle product in which the texture and appearance of the noodles is uniform, due to the difficulty in incorporating the proper amount of moisture in cooking the dried noodles before they are placed in the cans.

One of the principal objects of the present improvement is a method of making a canned food product, having a formed dough ingredient therein, whereby the operation of drying and curing the dough ingredient before it is incorporated in the product may be eliminated. Another object of the invention is the provision of a method by which a uniform quantity of the dough ingredients may be obtained in the canned food product. It is another object of the invention to provide a process for making chicken noodle soup and the like, which is more sanitary than the processes heretofore employed. A further object of the invention is the provision of a continuous process for making a satisfactory canned food product when a formed dough ingredient, such as noodles, is placed in the cans immediately after this ingredient is formed. A still further object of the invention is the provision of a method for making chicken noodle soup and the like, which will produce a food product in which the formed dough ingredient is of superior texture and appearance. An additional object of the invention is a continuous method for making a packaged food product, having a formed dough ingredient therein, without resorting to the intermediate steps of drying and curing the dough as heretofore practiced. Another important object of the invention is the provision of more efficient and economical procedure in the manufacture of food products having formed dough ingredients therein.

Other objects of the invention, as well as further advantages inherent therein, will be apparent from the following description, taken with the accompanying drawing, which illustrates diagrammatically the procedure which is followed in the practice of my improved method in connection with the formation of noodles from noodle dough and incorporating them as an ingredient in a canned food product.

In practicing the present invention in connection with the preparation of a canned food product, such as chicken noodle soup, the desired quantities of the dough ingredients, such as flour, eggs, water and salt, are mixed together under controlled conditions so that the resultant mixture has a temperature from 88° to 90° F. It is essential for the satisfactory operation of the method that the quantity of water used be such as to provide a comparatively stiff dough, that is, a dough which is relatively dry and stiff in comparison with the dough which is used in the conventional process of manufacturing noodles which are in a dry state in their final form. The mixture of dough ingredients is transferred to a kneader where it is worked until the glutinous properties of the flour are developed and a uniform plastic mass is produced. In view of the relatively dry character of the mixture which is used, dry powdery areas may be observed throughout the mass as it comes from the kneading machine. In order to avoid overworking and the consequent loss in protein strength, it is preferable to limit the kneading to a period of from 5 to 7 minutes in a conventional type of kneading pan rotating at about 7 R. P. M.

From the kneading pan the dough is transferred to an insulated resting box where it is maintained out of contact with the air for a period of from 30 to 40 minutes for the purpose of preventing loss of moisture from the dough while allowing the moisture in the dough to be redistributed before the dough is subjected to the operations of a dough brake. This resting period also acts to further develop the glutinose characteristics of the proteins and make the dough softer and more workable.

In the dough brake the mass of dough is repeatedly passed between a set of rollers in the customary manner, and upon completion of the braking operation the sheet, which is then approximately three-sixteenths of an inch thick, is wound into a roll. In view of the relatively dry character of the dough, the surface of the sheet would be too dry for immediate use as it comes from the dough brake, and to avoid this the roll of dough is again transferred to an insulated resting box where it is maintained out of contact with the air for a further period of from 30 to 40 minutes. During this period of rest, the moisture in the dough will again be redistributed so as to prevent the appearance of dry areas on the surfaces of the sheet.

At the conclusion of this second resting period, and by an uninterrupted procedure, the relatively thick sheet of dough is rolled into a thin sheet of the thickness desired for the noodles, the sheet is divided into strips of suitable width, the strips are severed into desired noodle lengths, and these lengths are deposited in permanent containers. The containers thus partly filled with noodles may then be moved to other filling positions where they receive the other desired ingredients of chicken noodle soup or the like.

As illustrated diagrammatically by the drawing, and in accordance with the procedure which I prefer to follow, the sheet of noodle dough 10 is taken from the roll 11 over a guide roll 12 and, while moving substantially in a horizontal direction, is passed through a set of calender rolls 13, 14, for initially reducing its thickness as indicated by the sheet 15. The sheet 15 continues horizontally through a set of calibrating rolls 16, 17, adjustable to and from each other to produce a sheet 18 of the final thickness desired in the noodles. If desired, the sheet 15 may be permitted to form a loop 19 in order that its surface may have additional time to dry before the sheet reaches the calibrating rolls 16, 17.

From the calibrating rolls 16, 17, the sheet continues its movement in a horizontal direction and passes over a guide roller 20 to a set of shredding rolls 21, 22, which may be of a type well known in the art for dividing the sheet into strips 23 of the desired width. This width is determined by the width of the annular ribs 24 and the cooperating annular grooves 25 on the shredding rolls. The set of shredding rolls is preferably so arranged that the strips of noodle dough are suspended from the rolls and move downwardly in side by side relation after the shredding operation.

The strips of dough 23, in groups separated by partitions 26, move downwardly past a stationary cutter 27 with which a rotary cutter 28 cooperates to sever the strips into noodle lengths. Upon being severed these noodle lengths drop downwardly through guide members 29 and are deposited in open topped cans 30 which have previously been moved into position beneath the strips. As the suspended strips 23 are arranged side by side, it will be understood that a plurality of noodle lengths are deposited in each can of a row directly beneath the strips at each rotation of the cutter 28. It is preferable to move successive rows of cans intermittently into position beneath the strips 23, and so time the movement that the cans in filling position are stationary at the time the noodles which they receive are severed from the strips. The line of cans with noodles therein may then be advanced during the rotation of the cutter 28 so that the next succeeding line may be moved into filling position when the cutter again operates to sever noodle lengths from the strips.

As illustrated in the drawing, the successive rows of cans may be formed from a line of cans delivered by a feed belt 31 to a position in front of a pusher 32. Intermittent movement of the pusher 32 operates to move the desired number of cans from the line on belt 31 and advance them step by step, in a row, into filling position on a filling table 33. In the subsequent movements of the pusher 32 the row of partly filled cans is moved step by step onto a discharge belt 34. The cans are then moved to other filling positions where additional ingredients, such as chicken and broth, are placed therein. They are then transferred to suitable apparatus for placing the covers thereon and sealing them, whereupon they are delivered to suitable heating apparatus, where the contents may be sterilized or cooked to such extent as may be desired.

As will be apparent from the above description, the improved process provides a continuous procedure wherein a comparatively dry and stiff mass of noodle dough of uniform plasticity is transformed into a sheet of the thickness desired in the noodles while the sheet is moving in a generally horizontal direction; that the sheet is divided so as to form vertically suspended or downwardly moving strips, and that the strips are severed into noodle lengths which continue their downward movement and are guided into suitable containers successively moved into and out of position beneath the strips. It is important that the dough employed in the process be relatively dry and stiff in comparison with the dough ordinarily used in the manufacture of noodles, in order to prevent the noodles from matting or adhering together in the practice of the process or in the cans, and to avoid any substantial increase in the length of the strips in their downward movement. Inasmuch as it is desirable to have a uniform quantity of noodles in each can, it will be apparent that any such elongation of the strips should be avoided if uniform lengths of the noodles is to be relied upon to produce noodles of uniform weight.

While certain procedure is disclosed herein for carrying out the improved process, it is to be understood that the invention is not intended to be limited to the precise process disclosed. The improvement is described with particular reference to the manufacture of chicken noodle soup, but it will be understood that it may also be employed in the manufacture of food products having other alimentary dough ingredients therein, such as spaghetti and macaroni. The above description and the accompanying drawing are therefore to be regarded as illustrative only, and it is to be understood that the invention is susceptible of modifications in procedure so long as such modifications come within the scope of the appended claims.

What I desire to claim is:

1. A continuous method of making chicken noodle soup which comprises preparing a stiff, plastic mass of noodle dough, forming the mass into a relatively thick sheet, moving the sheet continuously in a substantially horizontal direction and, while so moving, rolling the thick sheet into a thin sheet, dividing the thin sheet into vertically moving strips, intermittently moving a succession of permanent containers beneath the strips, severing the strips to deposit noodle lengths in the containers, filling the containers with other ingredients, sealing the containers, and heating the containers to sterilize the contents.

2. In a continuous method of making a canned food product containing noodles, the steps which comprise preparing a stiff, plastic mass of noodle dough, forming the mass into a relatively thick sheet and moving the sheet continuously, rolling the thick sheet into a thin sheet, forming the thin sheet into vertically moving, suspended, noodle strips, intermittently moving a succession of permanent containers into and out of position beneath the strips, intermittently severing the ends of the strips to deposit severed lengths of the undried strips directly in the containers, filling the containers with the other ingredients of the canned food product, sealing the containers, and subjecting the containers to heat to sterilize the contents.

3. A continuous method of making a canned food product containing noodles which comprises preparing a mixture of stiff noodle dough, alternately kneading the dough and subjecting it to a period of rest out of contact with the air to develop a uniform plastic mass and distribute the moisture therein, forming the mass into a relatively thick sheet, rolling the thick sheet into a thin sheet and dividing it into vertically moving strips arranged side by side, moving a succession of open containers beneath the strips, severing the strips into noodle lengths to deposit a plurality of the lengths in the containers, filling the containers with other ingredients, sealing the containers, and heating the containers to sterilize the contents.

PHILIP WALBURN SOUDER.